US012485589B2

(12) United States Patent
Mannhalter et al.

(10) Patent No.: US 12,485,589 B2
(45) Date of Patent: Dec. 2, 2025

(54) METHOD AND ARTICLE FOR AN IMPROVED COMPRESSION-MOLDING PROCESS

(71) Applicant: Arris Composites Inc., Berkeley, CA (US)

(72) Inventors: Bert D. Mannhalter, El Cerrito, CA (US); Allison R. Light, Orinda, CA (US); Eugene Joseph Gwost, Anacortes, WA (US); Ian Graham, Salt Lake City, UT (US)

(73) Assignee: Arris Composites Inc., Berkeley, CA (US)

( * ) Notice: Subject to any disclaimer, the term of this patent is extended or adjusted under 35 U.S.C. 154(b) by 111 days.

(21) Appl. No.: 18/130,170

(22) Filed: Apr. 3, 2023

(65) Prior Publication Data

US 2023/0311372 A1 Oct. 5, 2023

Related U.S. Application Data

(60) Provisional application No. 63/326,738, filed on Apr. 1, 2022.

(51) Int. Cl.
*B29C 43/18* (2006.01)
*B29C 43/00* (2006.01)
*B32B 5/12* (2006.01)

(52) U.S. Cl.
CPC ............ *B29C 43/18* (2013.01); *B29C 43/006* (2013.01); *B32B 5/12* (2013.01)

(58) Field of Classification Search
CPC ..... B29C 43/18; B29C 43/006; B29C 43/003; B29C 43/38; B32B 5/12; B29K 2105/08; B29K 2105/12; B29K 2105/122
See application file for complete search history.

(56) References Cited

U.S. PATENT DOCUMENTS 10,800,115 B2 10/2020 Escowitz et al.
2019/0002654 A1* 1/2019 Shinohara ................ C08J 5/042
(Continued)

OTHER PUBLICATIONS

Evangelia Delli, et al., Fibre length and loading impact on the properties of glass fibre reinforced polypropylene random composites, Feb. 11, 2021, Elsevier, Composite Structures vol. 263 (2021) 113678, pp. 1-10 (Year: 2021).*

*Primary Examiner* — Brian Handville
(74) *Attorney, Agent, or Firm* — Kaplan Breyer Schwarz, LLP

(57) ABSTRACT

An improved compression-molding process utilizes a unique assemblage of feed constituents, arranged, and aligned in a particular manner. The assemblage includes fiber-bundle preforms having a filamentous form with a typically circular or oval cross section, and having many thousands of relatively long, co-aligned, resin-impregnated fibers. The fiber-bundle preforms are formed to have an application-appropriate length and optionally shape. The assemblage further includes very-short-fiber constituents have a filamentous form and consisting of very short, typically non-aligned, resin-impregnated fibers. Although consisting of very short fibers, the very-short-fiber constituent may nevertheless be similar in length and cross section to the FB preforms to facilitate handling, registration with a mold cavity, and the like. In some embodiments, some of the very-short-fiber constituents are positioned in the assemblage proximal to expected locations of respective parting lines on the fiber-composite part to be molded. In some embodiments, the long axis of those very-short-fiber constituents is substantially parallel to the respective parting lines.

15 Claims, 5 Drawing Sheets

(56) References Cited

U.S. PATENT DOCUMENTS

| | | | |
|---|---|---|---|
| 2020/0114596 | A1 | 4/2020 | Davidson et al. |
| 2020/0361122 | A1 | 11/2020 | Pelman et al. |
| 2021/0279384 | A1 | 9/2021 | Bahamonde Jacome et al. |

* cited by examiner

FIG. 2
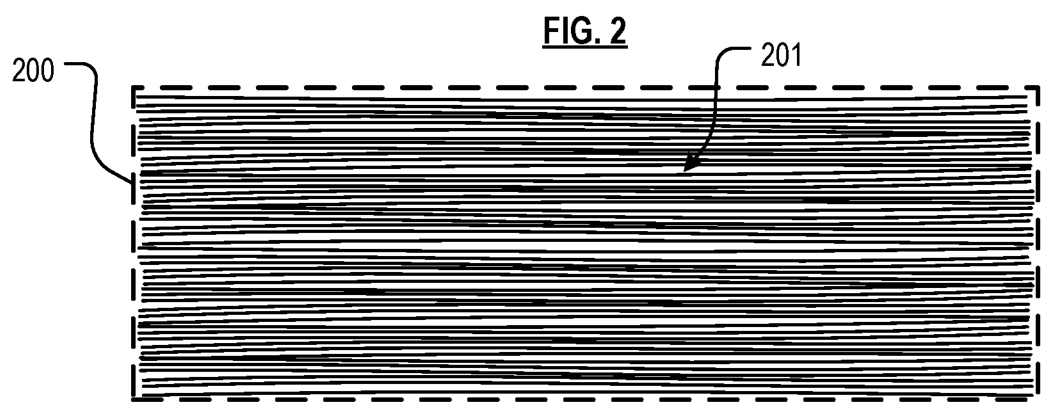
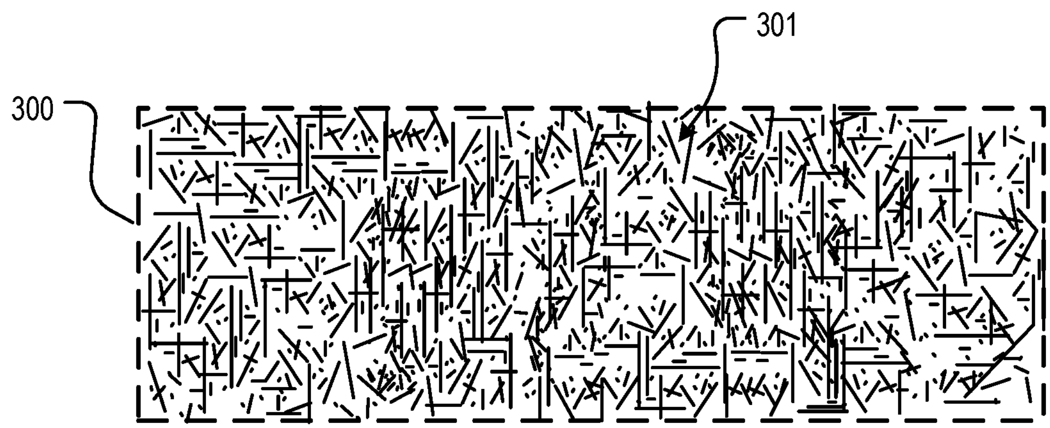
FIG. 3

100
102
104
106
108
114
116
112
424
110
110
120
118

426
427-4
132
427-2
132
427-1
132
132
427-3

424
300-2
300-3
300
300
300-1
300
200
300
300
300

424
A-A1
300-4
300-2
300-1
200
A-A2
300-3

A-A1
300-6
300-5
200
A-A2

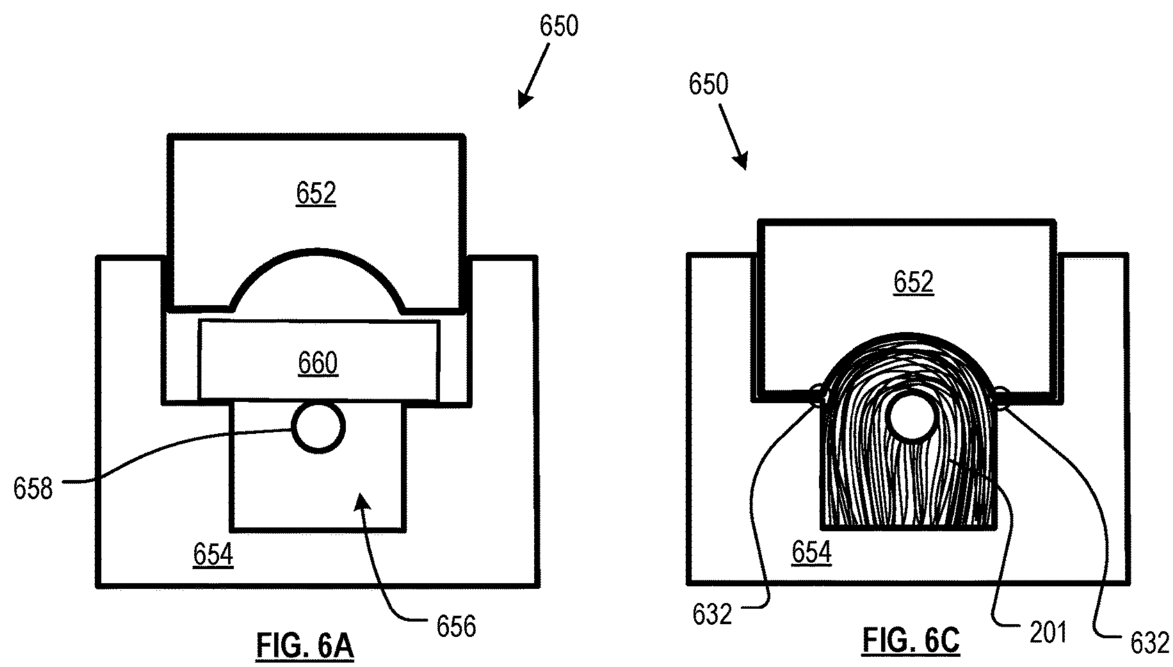
FIG. 6A
FIG. 6C
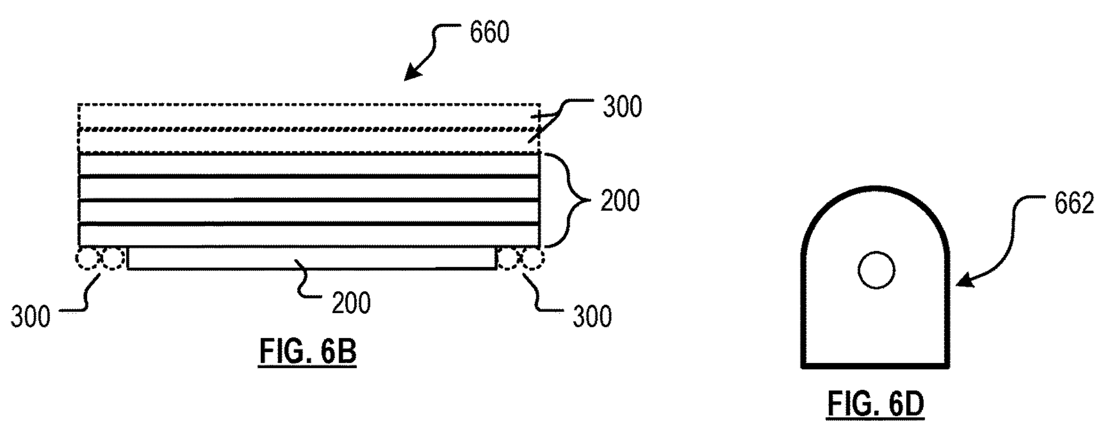
FIG. 6B
FIG. 6D

METHOD AND ARTICLE FOR AN IMPROVED COMPRESSION-MOLDING PROCESS

FIELD OF THE INVENTION

This specification claims priority of U.S. Pat. App. 63/326,738 filed Apr. 1, 2022, which is incorporated by reference herein.

FIELD OF THE INVENTION

The present invention pertains to compression molding.

BACKGROUND OF THE INVENTION

Compression molding is a molding process in which feed constituents-typically a thermoplastic or thermoset resin, and optionally fibers—are placed in a mold. Pressure (typically in excess of 1000 psi) is applied, and, if the resin is a thermoplastic, it is heated to a temperature at which it becomes flowable. Under the applied pressure, the resin conforms to the mold's geometry. The feed constituents are thus consolidated, wherein all but a very small amount of void space remains in the nascent part. After a short dwell (e.g., typically a few minutes) at elevated temperature and pressure, the mold is cooled and pressure is reduced. Once cooled, a finished part is removed from the mold.

Compression molding has advantages relative to other molding processes for at least certain applications, but it is not without its drawbacks. Among others, the process suffers from a difficulty in controlling the formation of "flash." Flash is excess material that remains attached to the molded product as well as to elements of the mold itself. As discussed below, it is caused by the flow of feed constituents into microscale gaps between movable elements of the mold.

FIGS. 1A-1F depict a conventional compression mold and compression molding process. Referring to FIG. 1A, compression mold 100 includes male mold portion 102 and female mold portion 110. Male mold portion includes horizontal walls 104 and angled walls 106, the angled walls defining plunger 108. Female mold portion 110 includes horizontal walls 112 and angled walls 114. The angled walls 114 in female mold portion 108 define, in part, mold cavity 116. Additionally, female mold portion 110 includes pin passages 118, which receive ejector pins 120.

In use, feed constituents 124 (resin and optionally fibers) are placed in mold cavity 116. Mold 100 is heated, as required, to render the resin flowable. Male mold portion 102 is advanced toward female mold portion 110, wherein plunger 108 compresses feed constituents 124. Under the applied pressure, the feed constituents conform to mold cavity 116. After a brief dwell at elevated temperature and pressure, nascent part 126 is cooled (FIG. 1B), the mold is opened, and ejector pins 120 eject the part from mold cavity 116 (FIG. 1D).

Referring to FIG. 1B, plunger 108 of male mold portion 102 advances into mold cavity 116 until horizontal walls 104 contact horizontal walls 112 of female mold portion 108 at plane 126 (extending into and out of the page), referred to as the "shutoff surface." As plunger 108 advances, its angled walls 106 slide past angled walls 114 of mold cavity 116. A microscale gap exists between angled walls 106 of plunger 108 and angled walls 114 of mold cavity 116 to enable such movement. Portion 130 of angled walls 112 that sees movement of plunger 108, but that does not form any of the final part geometry is referred to as the "shear wall." The portion 128 of the microscale gap within shear wall region 130 is referred to as the "shear gap."

Parting line 132, which appears as a "point" in the cross-sectional view of FIG. 1B, is a transition line along angled walls 114 where shear wall 130 ends and the part-forming portion of angled walls 114 begin. FIG. 1C (showing part 126) depicts the location of parting line 132, which, due to the geometry of mold 100, surrounds the upper surface of part 126.

To eject part 126, ejector pins 120, which are retracted within pin passages 118 in the body of female mold portion 110 during molding (see FIGS. 1A and 1B), partially deploy, extending proud of the bottom of mold cavity 116 (see FIG. 1D). To facilitate movement of ejector pins 120, their outer diameter is slightly smaller than the diameter of pin passages 118, creating microscale gap 122 therebetween.

Since the flowable thermoplastic resin is often pressurized to very high pressure, the resin (and fiber, if present) enters shear gap 128. Additionally, the resin/fiber can enter the region between respective horizontal walls 104 and 112 before mold 100 fully shuts. The trapped feed constituents thus become the hard stop for male mold portion 102. Also, the resin/fiber enters microscale gap 122 surrounding ejector pins 120.

As the molding cycle is completed and the mold is cooled, the resin within the various gaps hardens, becoming flash 134, depicted in FIGS. 1D and 1E. The flash includes the trapped material in shear gap 128, and may also include the material trapped between the horizontal walls 106 and 112 of the respective male and female mold portions. Additionally, flash may include material that was trapped in region 122 between the ejector pins and the pin passages.

After part 126 is ejected from the mold, flash 134 must then be cut, scraped, ground-off, or otherwise removed from part 126. FIG. 1E depicts part 126 prior to the removal of flash 134, and FIG. 1F depicts part 126 after flash 134 has been removed. In addition to the flash attached to part 126, some material may remain on tool surfaces, such as ejector pins 120, within pin passages 118, etc. Post processing to remove flash from the part and the molding tool involves (additional) time and labor, thereby increasing the cost of a compression-molding process.

SUMMARY

Embodiments of the present invention provide methods and articles that simplify the removal of the flash and extend compression-mold life, in addition to potentially providing benefits to a compression-molded part. Some embodiments of the invention provide an article for compression molding; in particular, an assemblage of feed constituents. The feed constituents have specific characteristics, and are positioned at specific locations and with specific orientations in the assemblage, as dictated by the position/orientation of the assemblage in the mold cavity.

The feed constituents in the assemblage include:

A) plural fiber-bundle ("FB") preforms having a filamentous form with a typically circular or oval cross section, and having many (typically multiples of thousands) of relatively long, co-aligned resin-impregnated fibers. These FB preforms are typically sourced from towpreg, formed as segments thereof that are cut to an application-appropriate length and optionally application-appropriate shape; and B) very-short-fiber ("VSF") constituents consisting of very short, typically non-aligned, resin-impregnated fibers. The VSF constituent typically has a filamentous form. Although consisting of very short fibers, the VSF constituent may nevertheless be similar in length and cross section to the FB preforms to facilitate handling, grouping with the FB preforms, registration with a mold cavity, etc.

By virtue of its very short fibers, and its location and orientation in mold cavity as part of the assemblage, the presence of VSF constituents can control the composition of the flash that is generated during a compression-molding process. In accordance with the illustrative embodiment, VSF constituents are: (i) disposed proximal to the (future) parting line(s) of the part being molded, and (ii) oriented so that the long axis (of their filamentous form) is substantially parallel to such parting lines. As a consequence, the flash generated during compression molding will consist of the material from the VSF constituents, rather than material (particularly the longer fibers) from the FB preforms. In some embodiments, VSF constituents are also situated proximal to the ejector pins, and have the same effect on the associated flash.

In comparison to flash consisting of relatively longer fibers, flash containing very-short-fibers in accordance with the present teachings provides several benefits, including, among any others:

It reduces the displacement of the longer/continuous fibers from the FB preforms that might otherwise occur if resin from the FB preforms (rather than from the VSF constituents) were to flow into the gaps (which would tend to carry the longer fibers with it). Such displacement, were it to occur, would result in a diminution of mechanical properties of the finished fiber-composite part.

It facilitates the removal of flash, since the flash now consists of very short fibers, rather than long fibers.

It increases mold longevity.

In addition to improvements in the compression-molding process, the present methods and articles result in improved compression-molded parts. For example, using VSF constituents in accordance with the present teachings enables decoupling part mechanical strength (as provided by FB preforms in the assemblage thereof) from other part attributes, such as may be provided by the VSF constituents. Consequently, embodiments of the invention reduce the need to compromise between various competing considerations. Additionally, the presence of the very-short-fibers from the VSF constituents, due to their ability to readily flow with the liquefied resin, assist in the alignment of the relatively longer fibers from the FB preforms, particularly for parts having a complex geometry. In particular, the relatively long fibers from the FB preforms are dragged along with the flowing very-short-fibers from the VSF constituents.

Some embodiments of the invention provide an assemblage of feed constituents for use in conjunction with a compression mold for compression-molding a fiber-composite part, the assemblage comprising:

a plurality of fiber bundle (FB) preforms, each FB preform consisting essentially of a plurality of co-aligned, resin-infused fibers, each FB preform having a filamentous form with a substantially circular or oval cross section; and a plurality of VSF constituents having a filamentous form, each VSF constituent consisting essentially of a plurality of resin-infused fibers, in the form of one or both of milled fibers and chopped fibers less than about 1 millimeter in length, wherein:

(a) the plurality of FB preforms and the plurality of VSF constituents are organized into an assemblage, and (b) respective FB preforms of the plurality thereof are individually positioned with a predetermined location and orientation in the assemblage, wherein the predetermined position and orientation in the assemblage results, within the fiber-composite part, in alignment of the fibers from the respective FB preforms with stress vectors expected to arise at those positions when the fiber-composite part is in use.

Some other embodiments of the invention provide an assemblage of feed constituents for use in conjunction with a compression mold for compression-molding a fiber-composite part, the assemblage comprising:

a plurality of fiber bundle (FB) preforms, each consisting essentially of a plurality of co-aligned, resin-infused fibers, and having a filamentous form with a substantially circular or oval cross section; and a plurality of VSF constituents having a filamentous form, each consisting essentially of a plurality of resin-infused milled and/or chopped fibers, both less than about 1 millimeter in length, wherein the plurality of FB preforms and the plurality of VSF constituents are organized into an assemblage, wherein some of the VSF constituents are positioned in the assemblage proximal to expected locations of respective parting lines on the fiber-composite part to be molded, and wherein a long axis of said some VSF constituents is substantially parallel to said respective parting lines.

And yet some additional embodiments of the invention provide a method for compression molding feed constituents to form a fiber-composite part, the method comprising:

a) forming an assemblage of the feed constituents, wherein the assemblage is similar in shape and size to the fiber-composite part, and wherein the feed constituents include:

(i) a plurality of fiber bundle (FB) preforms, each FB preform consisting essentially of a plurality of co-aligned, resin-infused fibers, each FB preform having a filamentous form with a substantially circular or oval cross section;

(ii) a plurality of VSF constituents having a filamentous form, each VSF constituent consisting essentially of a plurality of resin-infused fibers, in the form of one or both of milled fibers and chopped fibers less than about 1 millimeter in length, and wherein, in the assemblage, the FB preforms are individually positioned at predetermined locations and with predetermined orientations that result, within the fiber-composite part, in alignment of the fibers from respective FB preforms with stress vectors expected to arise when the fiber-composite part is in use; and (b) compression molding the assemblage by exposure to heat and pressure, thereby forming the fiber-composite part.

BRIEF DESCRIPTION OF THE DRAWINGS

FIG. 2 depicts a fiber-bundle preform in accordance with the present teachings.

FIG. 3 depicts a VSF constituent in accordance with the present teachings.

FIG. 6A though 6D depict compression molding of an article in accordance with an illustrative embodiment of the present invention.

DETAILED DESCRIPTION

Figures 1A, 1B, 1C, 1D, 1E, 1F:
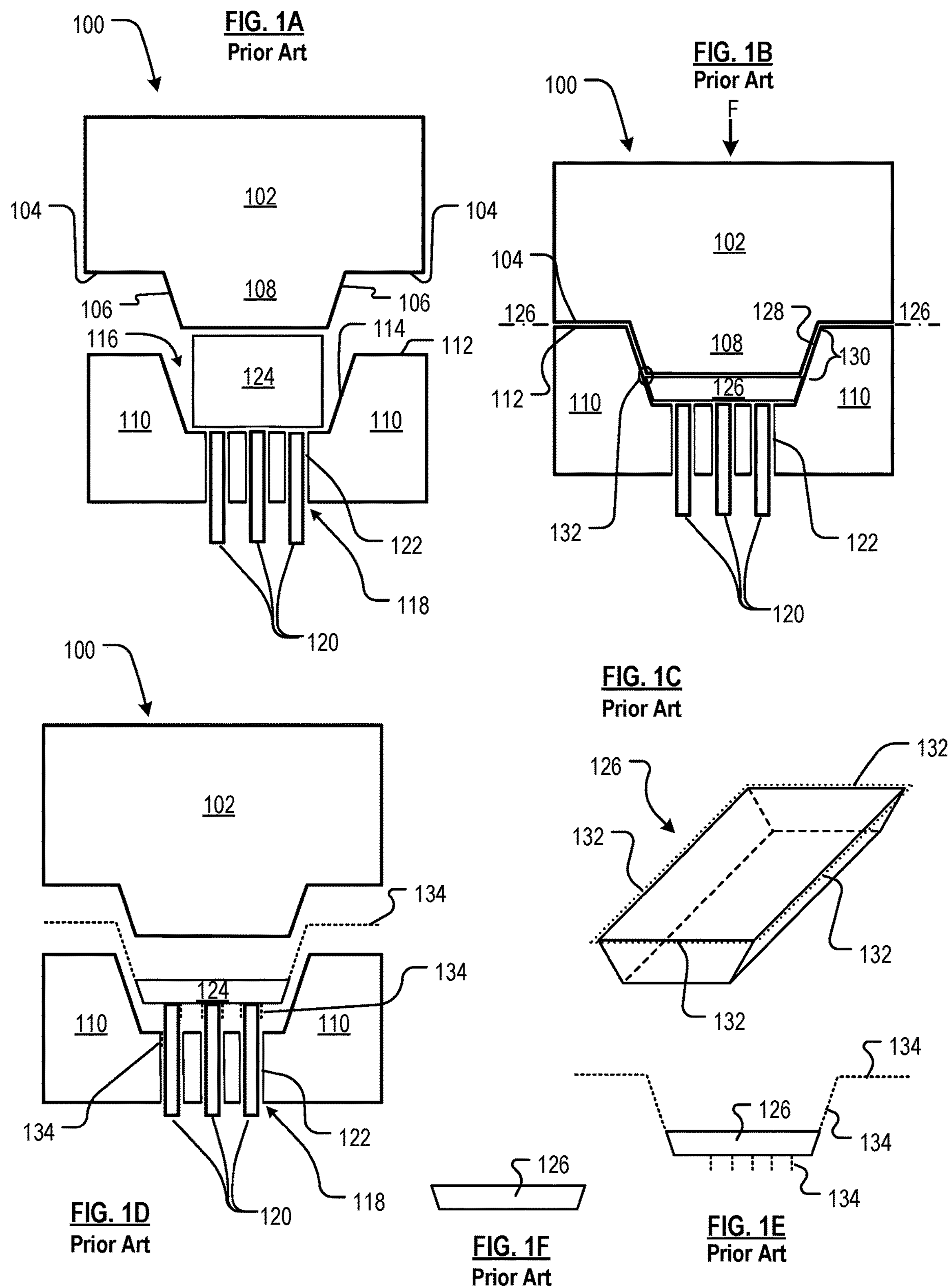
FIGS. 1A through 1F depict a conventional compression mold and compression molding process, including parts formed therefrom.

Definitions. The following terms and their inflected forms are defined for use in this description and the appended claims:

"Fiber" means an individual strand of material. A fiber has a length that is much greater than its diameter.

"Fiber bundle" means plural (typically multiples of one thousand) co-aligned fibers.

"Filamentous form" means a form factor akin to a filament; relatively long compared to its width, and having a typically circular or oval cross section. As used herein, a filamentous form is not irregular; it is typically linear/straight, although it may be bent at one or more locations, with straight segments between the bends.

"Tow" means a bundle of fibers (i.e., fiber bundle), and those terms are used interchangeably herein unless otherwise specified. Tows are typically available with fibers numbering in the thousands: a 1K tow (1000 fibers), 4K tow (4000 fibers), 8K tow, etc.

"Prepreg" means fibers that are impregnated with resin.

"Towpreg" means a fiber bundle (i.e., a tow) that is impregnated with resin.

"Preform" means a segment of plural, co-aligned, resin-impregnated, typically same-length fibers. The segment is cut to a specific length, and, in many cases, will be shaped (e.g., bent, twisted, etc.) to a specific form, as appropriate for the specific part being molded. Preforms are usually sourced from towpreg (i.e., the towpreg is sectioned to a desired length), but can also be from another source of plural co-aligned, unidirectionally aligned fibers (e.g., a resin impregnation process, etc.). Preforms are preferably, but not necessarily, substantially circular, or oval in cross section and have a filamentous form. Applicant's use of the term "preform" explicitly excludes groupings of fibers having a relatively "flat" form factor, such as (i) tape/ribbon, (ii) sheets of fiber, and (iii) mats/laminates, cut to shape or otherwise. The modifier "fiber-bundle" or "FB" may be pre-pended herein to the word "preform" to emphasize the nature of applicant's preforms and to distinguish them from prior-art preforms, which are typically in the form of tape/ribbon, sheets, mats, laminates, or shapes cut therefrom.

"Preform Charge" is an arrangement of feed constituents (FB preforms and/or VSF constituents) that are at least loosely bound together (i.e., tacked) to maintain their position relative to one another. Preform charges are not fully consolidated ("excess" void space remains such that the preform charge will generally not meet the specifications for a finished part).

"Preform Layup" is an arrangement of feed constituents (FB preforms and/or VSF constituents) that is formed by placing the feed constituents, one-by-one, into a mold cavity. A preform layup is distinguished from a preform charge, wherein for the latter, the feed constituents are at least loosely bound to one another, and is typically formed outside of the mold cavity.

"Assemblage of feed constituents" refers to either a preform charge, a preform layout, or a combination of both.

"Compatible" means, when used to refer to two different resin materials, that the two resins will mix and bond with one another.

"Compression molding" is a molding process that involves the application of heat and pressure to feed constituents. The feed constituents are typically placed in a female mold portion having a mold cavity. After the requisite amount of feed constituents are placed in the female mold half, a second mold half—a male mold half—is joined to the female mold half and the mold cavity is closed. The male mold half usually includes features (e.g., a plunger, etc.) that extend into the female male half to engage the feed constituents therein. For applicant's processes, the applied pressure is usually in the range of about 500 psi to about 5000 psi, and temperature, which is a function of the resin being used, is typically in the range of about 150° C. to about 400° C. Once the applied heat has increased the temperature of the resin above its melt temperature, it is no longer solid and will flow. The resin will then conform to the mold geometry via the applied pressure, and the feed constituents are thereby consolidated, resulting in a nascent part with very little void space. Elevated pressure and temperature are typically maintained for a few minutes. After this compression molding protocol is complete, the mold is cooled. Once cooled, pressure is released, and a finished part is removed from the mold.

"Consolidate" means, in the present context, that in a grouping of fibers/resin, void space is removed to the extent possible and as is acceptable for a final part. Feed constituents lose any unique or individual identity and any previously existing boundaries between adjacent FB preforms (i.e., in a lay-up or preform charge) are lost. This usually requires significantly elevated pressure, either using gas pressurization or the mechanical application of force (e.g., rollers, etc.), and elevated temperature (to soften/melt thermoplastic resin).

"Partial consolidation" means, in the present context, that in a grouping of fibers/resin, void space is not removed to the extent required for a final part. As an approximation, one to two orders of magnitude more pressure is required for full consolidation versus partial consolidation. As a further very rough generalization, to consolidate fiber composite material to about 80 percent of full consolidation requires only 20 percent of the pressure required to obtain full consolidation.

"Neat" resin or other matrix material means the resin/matrix material includes no reinforcing fibers.

"About" or "Substantially" means +/−20% with respect to a stated figure or nominal value.

Additional definitions may be provided, in context, elsewhere in this specification. All patents and published patent applications referenced in this disclosure are incorporated by reference herein.

It is to be understood that any numerical range recited herein is intended to include all sub-ranges encompassed therein. For example, a range of "1 to 10" is intended to include all sub-ranges between (and including) the recited minimum value of about 1 and the recited maximum value of about 10, that is, having a minimum value equal to or greater than about 1 and a maximum value of equal to or less than about 10. As a non-limiting example, a recited range of "1 to 10 μm" includes "5 to 8 μm", "1 to 4 μm", "2 to 9 μm", etc.

Feed Constituents. As previously noted, methods in accordance with the invention include, as feed constituents to a compression-molding process, fiber-bundle (FB) preforms and VSF constituents, both having a filamentous form.

FIG. 2 depicts, via a longitudinal cross section, a stylized representation of FB preform 200. Relatively long, co-aligned fibers 201 within preform 200 have a relatively uniform length, wherein the uniform length for any given FB preform (and its constituent fibers) is ≥5 millimeters, and may be as long as the maximum dimension of any given part (in which case the fibers are referred to as "continuous" fibers). By way of example, the preforms/fibers can be meters long in appropriate embodiments (e.g., aircraft wing, automotive body part, etc.). More typically, FB preform will have a length of tens of millimeters, and have a length much longer than their diameter.

FB preforms are typically formed from towpreg, but may alternatively be sourced from the output of a resin impregnation line. To form an FB preform from either source, a length of the resin-impregnated fibers is cut into segments of a desired size and often shaped (e.g., bent, etc.) as well. Each FB preform include thousands of co-aligned, resin-infused fibers, typically in multiples of one thousand (e.g., 1 k, 10 k, 24 k, etc.). An FB preform may have any suitable cross-sectional shape (e.g., circular, oval, trilobal, polygonal, etc.), but is most typically circular or oval. It is notable that the term "FB preform," as used herein and in the appended claims, excludes fibers, bundled together or otherwise, that are grouped into a relatively flat form factor, such as that of tape/ribbon, sheets, laminates formed from tape/ribbon or sheets, mats, or shapes cut from tape/ribbon, sheets, laminates, or mats.

FIG. 3 depicts a stylized representation of VSF constituent 300, showing a plurality of relatively short, randomly oriented fibers 301 therein. The VSF constituents include fibers having lengths in the range of about: 0<fiber length≤1 millimeters (mm). That is, the fibers within a given VSF constituent will typically vary within the above-mentioned range. A lower limit of fiber length will be about 0.01 mm (10 microns). Fibers used in the VSF constituents include, without limitation, milled fiber and chopped fiber.

In the illustrative embodiment, VSF constituent 300 has a filamentous form factor. Importantly, as described further below, the filamentous form enables aligning the long axis of VSF constituents 300 as desired, such as to be substantially parallel with the parting line(s) on a molded part that result from compression molding. Moreover, the filamentous form factor of VSF constituents 300 facilitates their incorporation with FB preforms (of the same form factor) into a preform charge. The filamentous form of VSF constituents 300 also enables positioning them with a desired alignment/orientation (whether in a lay-up or in a preform charge), and facilitates consistent and accurate registration with a mold cavity of a compression mold. In some embodiments, VSF constituents having a non-filamentous form (i.e., pellet, tape, sheet, etc.) accompany, in the mold cavity, VSF constituents having a filamentous form.

It is notable that VSF constituent 300, as opposed to fibers 301 contained therein, is often substantially longer than 1 millimeter and will typically have the same or similar length as FB preforms 200 with which they are used. In some embodiments, formers (e.g., extruders, etc.) are used to create VSF constituents in a filamentous form.

Although fibers 301 in VSF constituents 300 are usually randomly oriented, certain processes for fabricating the present VSF constituents can cause the longest of very short fibers 301 (i.e., those having a length of about 1 mm) to align to some extent. During compression molding, however, any previously existing alignment of 1 mm or shorter fibers will typically be lost. That is not the case for fibers 201 within FB preforms 200, which, depending on their length within the stated range, will either maintain their initial position and alignment in the mold cavity (for fibers having a length greater than about 40 mm), or flow (for fiber having a length less than about 40 mm) as the thermoplastic resin is liquefied. Such flowed fibers will typically adopt an alignment consistent with local flow vectors.

The individual fibers in both FB preform 200 and VSF constituent 300 can have any diameter, which is typically, but not necessarily, in a range of 1 to 100 microns. Individual fibers can include an exterior coating such as, without limitation, sizing, to facilitate processing, adhesion of binder, minimize self-adhesion of fibers, or impart certain characteristics (e.g., electrical conductivity, etc.).

Each individual fiber can be formed of a single material or multiple materials (such as from the materials listed below), or can itself be a composite. For example, an individual fiber can comprise a core (of a first material) that is coated with a second material, such as an electrically conductive material, an electrically insulating material, a thermally conductive material, or a thermally insulating material.

In terms of composition, each individual fiber can be, for example and without limitation, carbon, carbon nanotubes, glass, natural fibers, aramid, boron, metal, ceramic, polymer, synthetic fibers, and others. Non-limiting examples of metal fibers include steel, titanium, tungsten, aluminum, gold, silver, alloys of any of the foregoing, and shape-memory alloys. "Ceramic" refers to all inorganic and non-metallic materials. Non-limiting examples of ceramic fiber include glass (e.g., S-glass, E-glass, AR-glass, etc.), quartz, metal oxide (e.g., alumina), alumina silicate, calcium silicate, rock wool, boron nitride, silicon carbide, and combinations of any of the foregoing. Non-limiting examples of suitable synthetic fibers include nylon (polyamides), polyester, polypropylene, meta-aramid, para-aramid, polyphenylene sulfide, and rayon (regenerated cellulose).

Any resin-thermoplastic or thermoset—that bonds to itself under heat and/or pressure can be used in conjunction with embodiments of the invention.

Exemplary thermoplastic resins useful in conjunction with embodiments of the invention include, without limitation, acrylonitrile butadiene styrene (ABS), ethylene tetrafluoroethylene (ETFE), fluorinated ethylene propylene (FEP), liquid crystal polymers (LCPs), polyamides (Nylon), polyaryletherketones (PAEK), polybenzimidazole (PBI), polybutylene terephthalate (PBT), polycarbonates (PC), and polycarbonate-ABS (PC-ABS), polyethylene (PE), polyetheretherketone (PEEK), polyetherimide (PEI), polyether sulfones (PES), polyethylene terephthalate (PET), perfluoroalkoxy copolymer (PFA), polyimide (PI), polymethylmethacrylate (PMMA), polyoxymethylene (polyacetals) (POM), polypropylene (PP), polyphosphoric acid (PPA), polyphenylene ether (PPE), polyphenylene oxide (PPO), polyphenylene sulfide (PPS), polyphenylsulfone (PPSU), Polystyrene (PS), polysulfone (PSU), polytetrafluoroethylene (PTFE), polyurethane (PU), polyvinyl chloride (PVC), styrene acrylonitrile (SAN), and styrene butadiene styrene (SBS). A thermoplastic can be a thermoplastic elastomer such as polyurethane elastomer, polyether ester block copolymer, styrenic block copolymer, polyolefin elastomer, polyether block amide, thermoplastic olefins, elastomeric alloys (TPE and TPV), thermoplastic polyurethanes, thermoplastic copolyesters, thermoplastic polyamides, and thermoplastic silicone vulcanizate.

Non-limiting examples of suitable thermosets include araldite, bakelites, epoxies, melamines, phenol/formaldehydes, polyesters, polyhexahydrotriazines, polyimides, polyisocyanates, polyureas, silicones, urea/formaldehydes, vinyl esters, phenolics, and polycarbonates. Suitable thermosets can be prepared as a partially cured B-stage.

Processing. The two types of feed constituents—FB preforms 200 and VSF constituents 300—are positioned in a mold cavity in preparation for compression molding. FB Preforms 200 will typically represent most of the mass of the feed constituents for fabricating a fiber-composite part, as they will dictate the mechanical properties of the part. The feed constituents are organized into an assemblage that typically has a near-net shape. They will be arranged to: (i) provide the desired fiber alignment in the finished part, (ii) impact the composition of flash, and, optionally (iii) impart non-mechanical properties to the finished part.

Although feed constituents (FB preforms 200 and VSF constituents 300) can be added one-by-one to a mold cavity (forming a "lay-up"), for both process efficiency as well as a substantially greater likelihood that the desired alignment of feed constituents is maintained, they are preferably organized as a "preform charge." The preform charge, which is typically a three-dimensional arrangement of feed constituents, is usually created in a fixture separate from the mold that is used to form a final fiber-composite part. Such a "preform-charge fixture" is dedicated to, and specifically designed for, the creation of a preform charge having a particular size and configuration.

To create a preform charge, the feed constituents are placed (either automatically or by hand) in a preform-charge fixture. By virtue of the configuration of the preform-charge fixture, the feed constituents are organized into a specific geometry and are then "tacked" (joined) together, such as via heating (to soften thermoplastic resin) and under minimal applied pressure. It is notable that to create a preform charge, thermoplastic resin is typically not heated to its melt temperature, since a key function of the preform charge is, to the extent possible, to maintain the original shape/form/alignment of the feed constituents, particularly FB preforms, since that impacts fiber alignment in the molded part. As such, it is desirable for individual feed constituents to retain aspects of their original form within the preform charge. The shape of the preform charge usually mirrors that of the intended part (or a portion of it), and, hence, the mold cavity (or at least a portion thereof) that forms the part. See, e.g., Publ. Pat. Apps. US2020/0114596 and US2020/0361122.

As compared to a final part in which fibers/resin are fully consolidated, in a preform charge, the feed constituents are only partially consolidated. This is because there is insufficient pressure and insufficient temperature for full consolidation. Whereas applicant's compression-molding processes are often conducted at a pressure of thousands of psi with the thermoplastic resin in the melt-flow state, the downward pressure applied to the feed constituents to create a preform charge in accordance with the present teachings is typically in the range of about 10 psi to a maximum of about 500 psi. And, as previously noted, the temperature of the thermoplastic resin is not raised to its melt temperature during the tacking process. Thus, voids remain in a preform charge. Although a preform charge is not fully consolidated, the feed constituents in a preform charge will not move, thereby maintaining the desired geometry and the specific alignment of each such feed constituent in the assemblage.

In some embodiments, an assemblage of FB preforms 200 (formed as either a preform charge or a layup) is placed in a mold cavity, after which VSF constituents 300 are added to the mold cavity. In some other embodiments, VSF constituents 300 are incorporated directly into the preform charge during fabrication thereof. As previously noted, VSF constituents will typically have a form factor that matches the form factor of the FB preforms. This facilitates incorporating them into a preform charge that includes FB preforms, as well as registering the VSF constituents 300 (if they are not part of the preform charge) with the mold cavity. Thus, notwithstanding the fact that VSF constituents 300 will typically contain much shorter fibers than FB preforms 200, the overall dimensions of VSF constituents 300 will typically match or nearly match those of the FB preforms.

In various embodiments, the assemblage of feed constituents can be (i) a single preform charge including both FB preforms and VSF constituents, (ii) plural preform charges, at least one of which includes only FB preforms and at least one of which includes only VSF constituents, (iii) a preform charge consisting of FB preforms accompanied by individual (a lay-up of) VSF constituents, (iv) a preform charge consisting of VSF constituents accompanied by a lay-up of FB preforms, or (v) a lay-up that includes both FB preforms and VSF constituents but no preform charge.

After the assemblage is placed (or formed) in the mold, the mold is closed and the compression-molding process proceeds. The applied pressure during compression molding is usually in the range of about 500 psi to about 3000 psi, and temperature, which is a function of the resin(s) being used, is typically in the range of about 150° C. to about 400° C. (for thermoplastic resins). Once the applied heat has increased the temperature of a (thermoplastic) resin above its melt temperature, it is no longer solid and will flow. The resin will then conform to the mold geometry under the applied pressure. Elevated pressure and temperature are typically maintained for a few minutes in accordance with standard compression-molding protocols. After a usually brief dwell (e.g., a few minutes, etc.) at temperature and pressure, the mold is cooled. Once cooled, pressure is released and the finished part is removed from the mold.

Applications. Embodiments of the invention result in an improved compression molding process, and additionally provide an enhanced ability to tailor and improve fiber-composite parts formed therefrom.

Improved Compression-Molding Process. When VSF constituents 300 are properly located and oriented relative to the (future) parting line(s) of the compression molded part, the flash generated during compression molding will consist of the material from the VSF constituents, rather than material from the FB preforms.

Figure 4A:
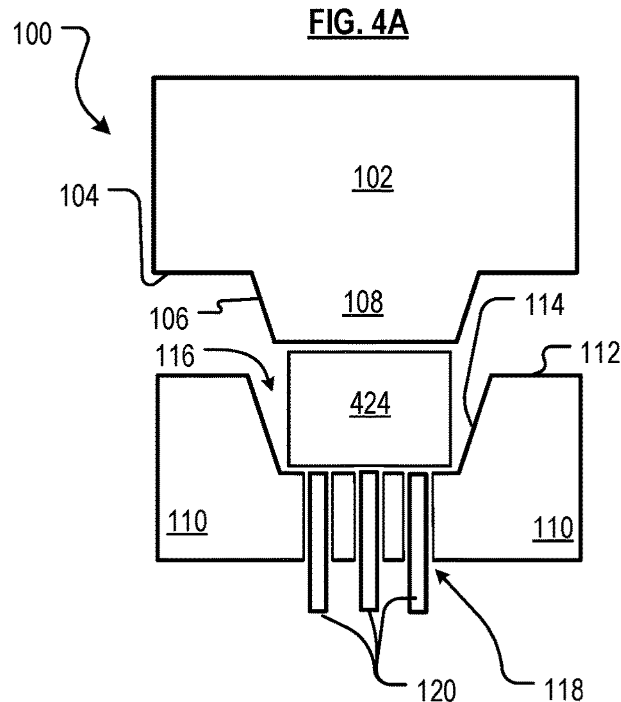
FIGS. 4A through 4E depict compression molding of an article in accordance with an illustrative embodiment of the present invention.
Figure 4B:
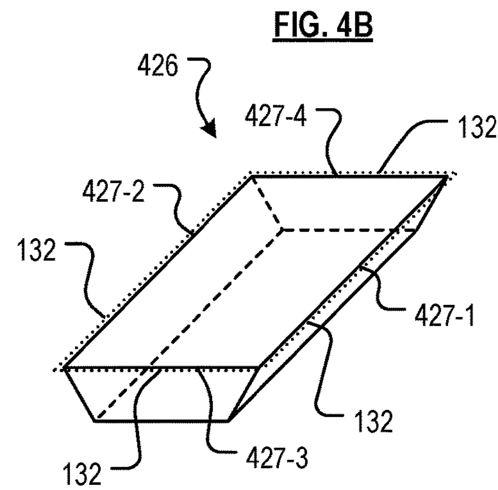
Figure 4C:
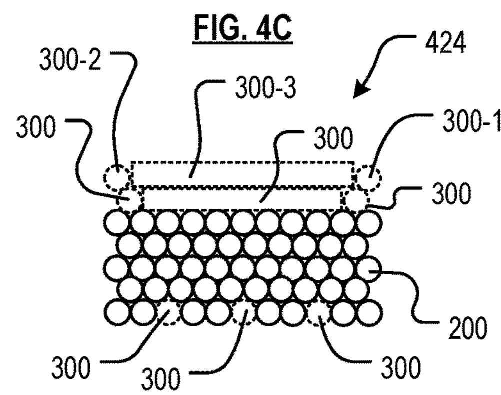
Figure 4D:
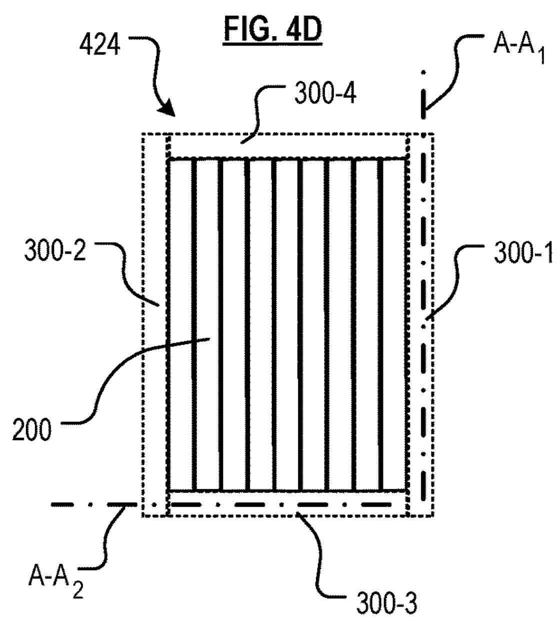

FIG. 4A depicts compression mold 100, wherein assemblage 424 consisting of FB preforms 200 and VSF constituents 300 is disposed in mold cavity 116 in preparation for compression molding. Compression mold 100 depicted in FIG. 4A is identical to compression mold 100 depicted in FIG. 1A. FIG. 4B depicts final part 426 (flash not depicted), showing the location of parting line(s) 132 relative to the part. FIGS. 4C and 4D depict respective end and top views of assemblage 424 for forming part 426 so that the flash (not depicted) contains very short fibers from VSF constituents 300 rather than relatively longer fibers from FB preforms 200, in accordance with the present teachings.

In the illustrative embodiment depicted in FIG. 4C, assemblage 424 is a preform charge. Assemblage 424 include plural FB preforms 200 and plural VSF constituents 300, the latter depicted in "dotted lines" for contrast and clarity of illustration.

Three VSF constituents 300 are depicted in the bottom row of assemblage 424. These constituents are positioned so that when assemblage 424 is placed in mold cavity 116, they will overlie the locations of pin passages 118/ejector pins 120. It is to be understood that there are multiple additional groupings of ejector pins 120 extending into (and out of) the page (oriented vertically as depicted), wherein VSF constituents 300 extend in the same direction such that at least some of the very short fibers from these constituents are likely to flow along with resin into pin passages 118 during compression molding operations.

Referring now to FIGS. 4C and 4D, VSF constituents 300 are also located along the edges of the top two rows of assemblage 424. Referring to FIG. 4B, it can be seen that this positions these VSF constituents 300 proximal to where parting line(s) 132 will be formed. Moreover, long axis A-A of each of those VSF constituents 300 is substantially parallel to the (future) location of nearest parting line 132. Thus, VSF constituent 300-1 is oriented in assemblage 424 so that when the assemblage is in the mold cavity, long axis A-$A_1$ of VSF constituent 300-1 is substantially parallel to parting line 132 that appears at edge 427-1 of (future) part 426. Similarly for the long axis of VSF constituent 300-2 as being substantially parallel to parting line 132 that appears at edge 427-2, long axis A-$A_2$ of VSF constituent 300-3 as being substantially parallel to parting line 132 that appears at edge 427-3, and the long axis of VSF constituent 300-4 as being substantially parallel to parting line 132 that appears at edge 427-4. A second layer of such perimeter-located, VSF constituents 300 is located below the uppermost layer. It will be appreciated from the foregoing that position and orientation of VSF constituents 300 in assemblage 424 is a function of the orientation and fit of the assemblage in mold cavity 116.

Figure 4E:
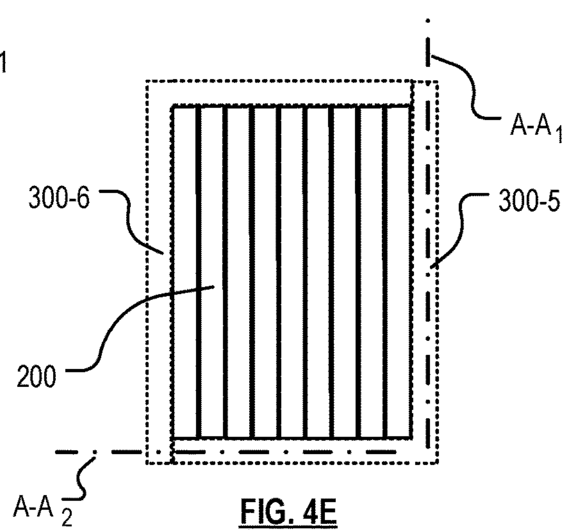

FIG. 4E depicts a top view of another embodiment of assemblage 424. In this embodiment, two VSF constituents 300-5 and 300-6 are used in the top row of the assemblage, rather than four VSF constituents 300-1 through 300-4. This embodiment illustrates the shaping capability of VSF constituents 300, which is due to their filamentous form. Each of VSF constituents 300-5 and 300-6 includes a bend, which enables each such constituent to be positioned along two adjacent edges of assemblage 424. For example, long axis A-$A_2$ of one portion of VSF constituent 300-5 is substantially parallel to parting line 132 that appears at edge 427-3, and long axis A-$A_1$ of the other portion (i.e., on the other side of the bend) is substantially parallel to parting line 132 that appears at edge 427-1. A VSF constituent bent in this manner achieves the same result as two individual straight segments, but does so while requiring fewer "pick-and-place" steps for creating assemblage 424.

As previously described, rather than incorporating all FB preforms 200 and VSF constituents 300 into a preform charge, assemblage 424 may be a combination of a preform charge and other individual feed constituents. For example, in some embodiments, the preform charge consists solely of FB preforms 200. In some of such embodiments, the preform charge may first be added to the mold cavity, after which VSF constituents 300 are appropriately positioned and aligned on top of the preform charge. And, as appropriate, VSF constituents 300 can be placed in the mold cavity prior to the preform charge, to address the issue of flash associated with the pin passages/ejector pins.

In any case, arranging VSF constituents 300 in assemblage 424 as depicted results in a flow of very-short fibers, rather than longer fibers from FB preforms 200, into the microscale gaps (see discussion accompanying FIGS. 1A through 1F) during the compression-molding process. As such, the resulting flash contains very short fibers, rather than the relatively longer fibers.

The preferential flow of very short fibers into the microscale gaps reduces the displacement of the longer/continuous fibers from a desired location within the nascent part. Such displacement, were it to occur, would result in a diminution of mechanical properties of the finished fiber-composite part.

Furthermore, the addition of VSF constituents makes flash removal easier than if the flash included long/continuous fibers. Because the fibers associated with the VSF constituents are typically much shorter than those from FB preforms, any such fibers in the resulting flash will not be well anchored to the bulk of the part (i.e., will not intertwine with the relatively longer fibers from the FB preforms). Laser removal of flash, for example, is much improved due to the use of the VSF constituents. Specifically, the thermoplastic matrix ablates or melts at much lower temperatures and input energies than most reinforcing fibers, such as carbon or glass fiber. To the extent that the longer fibers associated with FB preforms flow into the flash, such fibers must be completely severed to remove the flash from the part. Since the energy requirement for cutting these fibers is substantially greater than that required to ablate thermoplastic, this slows the flash removal process. Cutting is avoided, however, when the flash consists of very-short-fibers (from the very-short-constituents). Consequently, flash removal proceeds with much less energy input and much more quickly.

The presence of VSF constituents can also result in improved mold longevity. Shorter fibers have increased lubricity relative to longer fibers. When molding parts using FB preforms only, the relative long fibers cause wear on the mold. Over time, this alters the parts fabricated form the mold, ultimately requiring mold replacement. Because the fibers from the VSF constituents tend to be much shorter than those sourced from FB preforms, the presence of the former reduces mold wear, requiring less frequent mold replacement.

Improved Fiber-Composite Parts. As described further below, using VSF constituents 300 in conjunction with FB preforms 200 may improve certain properties of compression-molded, fiber-composite parts as well as provide an enhanced ability to impart desired properties.

EM Radiation Transparency/Opacity. Depending on fiber type, as well as fiber volume fraction (FVF), fiber-composite parts formed in accordance with the present teachings can exhibit a wide range of transparency/opacity to electromagnetic (EM) radiation of any frequency. This has implications for a variety of fields; for example, the outer casing of cell phones must be EM transparent to support communications.

Fibers from VSF constituents 300 are better able, than fibers from FB preforms 200, to fill small regions of a mold, such as are used to form fine features of a part. Typically, fibers 301 from VSF constituents 300 are flowed to these regions during the compression molding process, rather than placing them in such small regions prior to mold closing.

In some of such "flowed-fiber" embodiments, VSF constituents 300 are placed in a plunger cavity along with a stack of FB preforms 200. VSF constituents 300 are positioned in the plunger cavity nearest to the inlet of the mold cavity proper. In some embodiments, the VSF constituents are organized as a first preform charge, and the FB preforms are organized as a second preform charge. In some other embodiments, all feed constituents are combined in a single preform charge, and in yet some further embodiments, some feed constituents form a preform charge and others remain separate.

Figure 5:
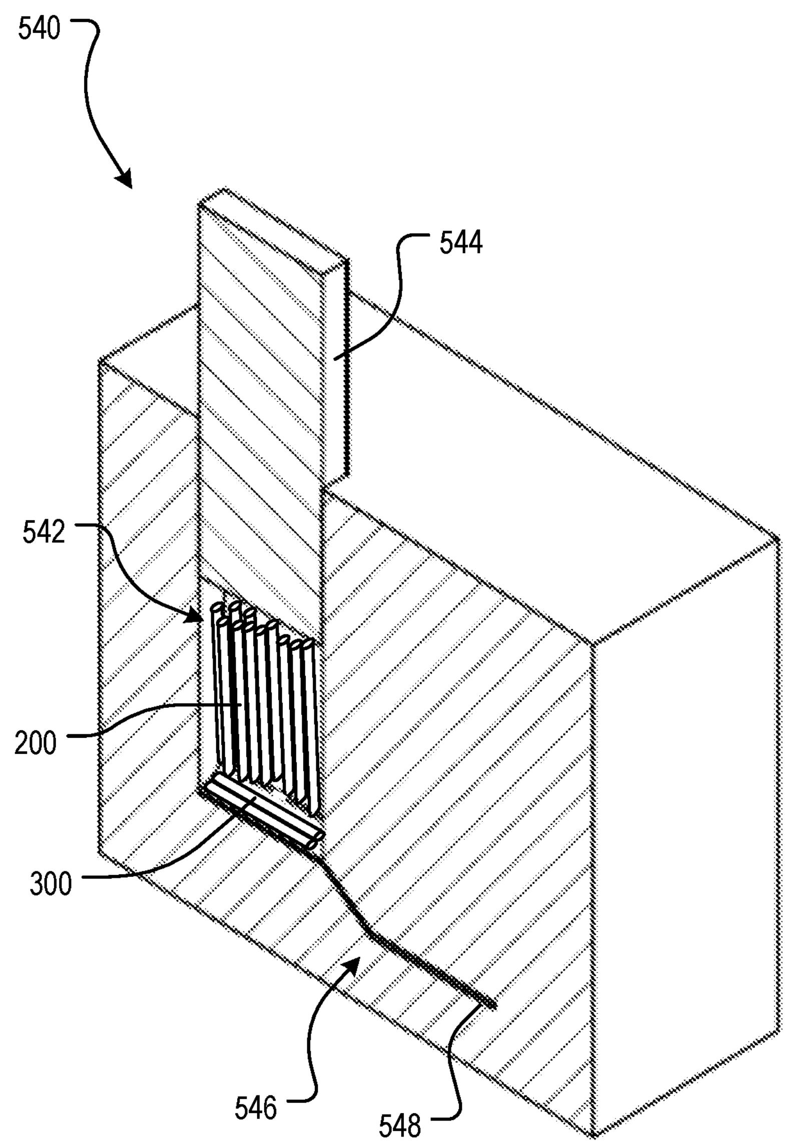
FIG. 5 depicts an alternative embodiment of the invention.

FIG. 5 depicts such an embodiment, wherein mold 540 includes plunger cavity 542 and plunger 544. The bottom of mold cavity 542 is in fluidic communication with mold cavity 546. As mentioned above, VSF constituents 300 are positioned nearest to the inlet of mold cavity 546. Consequently, very short fibers from VSF constituents 300 will be first to flow into the mold cavity (before longer fibers from FB preforms 200), and thus fill small regions 548 of the mold cavity. It would be more difficult to fill such small regions with longer, but still flowable fibers (typically 2 to 40 mm in length). In some embodiments, the distal ends of such small regions are vented (via vents) to create a local pressure differential, which generates a local flow through such small features. This facilitates the flow of very short fibers into such features. This approach enables the creation of parts with relatively more complex geometries, features, and additional functionality.

In some embodiments, an ability to flow very short fibers from VSF constituents 300, and tailor fiber volume fraction thereof in small discrete regions of a part facilitates the fabrication of an "RF window." This enables a part having, for example, an internal antenna, to receive and transmit signals with satisfactory signal quality while having minimal impact on part mechanical properties.

Conversely, in some other embodiments, this capability facilitates the creation and selective placement of "EM shielding" in a fiber-composite part that is otherwise largely EM transparent. Consider a primarily EM-transparent part that houses several different electronic components that must be electromagnetically shielded from one another. In some of such embodiments, VSF constituents would be positioned as required among FB preforms in a preform charge, and then placed in a mold for compression molding. In some other embodiments, VSF constituents 300 are situated in a mold between adjacent preform charges that consist of FB preforms. This will create EM shielding between the regions of the part that are formed from those preform charges.

In either approach, nestled among the relatively long fibers from the FB preforms, there will be minimal flow of very short fibers from VSF constituents 300. In this manner, the very short fibers can be precisely positioned in the finished part to accomplish such shielding, thereby reducing/preventing EM interference between such components. Yet, the presence of such very short fibers 330 has a negligible impact on mechanical performance; that is, their presence is preferable to a scenario in which such regions consist of neat resin.

Color. In another embodiment, using VSF constituents 300 in accordance with embodiments of the invention facilitates the introduction of color to the surface of a part. For example, in some embodiments, the resin in VSF constituents 300 are dyed (virtually any color). Positioned near the walls of a mold cavity, the dyed resin from VSF constituents 300 will form the surface region of a part being formed, and lend its color thereto. Additionally, fibers used in VSF constituents 200 can be selected to provide optical transparency, so that the dyed matrix material does not show any discoloration from the underlying fibers. In some embodiments, glass fibers are used for this purpose.

Improved bonding. Additionally, it has been found that embodiments of the invention provide a smoother surface finish to a fiber-composite part, which, in addition to any other benefits, results in an improved ability to bond a fiber-composite part to another part. This improved bonding performance is due to an enhanced intimacy of surface contact.

CTE matching. In other of its processes, applicant has added neat resin or other non-reinforced matrix materials to improve the surface finish of parts. Such materials can have significantly different coefficients of thermal expansion (CTE) than the bulk of the part, which includes the fibers and resin sourced from FB preforms 200. Consequently, a region of a part consisting mostly of neat resin might have a markedly different CTE than a region consisting mostly of fiber-reinforced matrix (i.e., fibers dispersed within solidified resin). This difference in CTE can result in unevenness on the part's surface, manifesting as sink marks or other imperfections. By contrast, VSF constituents 300 of embodiments of the invention can be designed to include resin/fiber having a CTE that more closely matches the CTE of fiber-reinforced matrix (as sourced from preforms 200). This improved CTE matching results in a reduced incidence of sink marks and other cosmetic blemishes.

These examples demonstrate how embodiments of the invention are able, serendipitously, to decouple part mechanical strength (as provided by FB preforms 200 in the assemblage thereof) from other part attributes (e.g., EM properties, color, etc.), such as may be provided by VSF constituents 300. Consequently, embodiments of the invention reduce the need to compromise between various competing considerations.

Regarding "mechanical strength," the composite (i.e., fiber and resin) feedstock constituents that have conventionally been used for compression molding are available in several form factors, including ribbon/tape, sheets, laminates, and shapes cut out from the sheets, etc. The fibers in these types of constituents are typically co-aligned (i.e., substantially parallel to one another), extending in one direction. An exception is a "weave," wherein the fibers within a sheet or mat extend, in-plane, in two orthogonal directions. A further exception is a "mat," in which fibers tend to be randomly oriented, regardless of their length.

It is well known that a part exhibits best mechanical properties when the fibers therein align with stress vectors that arise in the part when it is in use. However, when using feedstock constituents having the conventional form factors, there is very little ability to arrange them in a mold cavity such that the fibers align with the desired specificity. When using such constituents, they are typically laid-up one on top of another in a mold cavity. In some cases, an overlying feed constituent (e.g., a sheet of composite material) is rotated by some amount (e.g., 15, degrees, 30 degrees, 45 degrees, etc.) relative to an underlying feed constituent to alter the fiber alignment. But this approach is only marginally successful at aligning the fibers with the anticipated stress vectors.

Embodiments of the invention use fiber-bundle (FB) preforms, as opposed to the feedstock constituents having the conventional form factors mentioned above. Such FB preforms are typically formed from individual runs of towpreg, which includes thousands of co-aligned, relatively long and typically continuous fibers (i.e., fibers as long as the region of the part that the fibers are intended to occupy). The diameter of towpreg is a function of the type of fibers and number of fibers (i.e., in multiples of 1000 fibers). The towpreg used in conjunction with embodiments of the invention has a diameter that is typically within the range of about 0.7 to 3.0 millimeters. FB preforms will have the same diameter as the source towpreg, and be formed (e.g., by segmenting the towpreg, etc.) in application-specific lengths that typically range from multiple tens of millimeters to multiple meters, thus having a form factor akin to a length of wire or angel-hair pasta. The FB preforms can be bent into a variety of shapes.

It will be clear that, as compared to feed constituents having very wide (relative to their length) planar form factors like that of a sheet, etc., applicant's wire-like FB preform can be placed in a mold cavity so that the fibers therefrom align with a much higher degree of specificity and conformance to expected principal stress vectors in the final part. Although a composite feed constituent in the form of tape/ribbon is narrower than a sheet of such material, it too is quite limited in the ability to vary alignment along its length. For example, attempts at forming in-plane bends of any more than the slightest amount will deform a tape/ribbon out-of-plane (i.e., like a "banked" curve).

For a part having a simple geometry, those skilled in the art will know how to align fibers for best part strength without resorting to mathematical analysis. For more complicated scenarios, either as consequence of part geometry, the forces to which the part is subjected in use, or both, the anticipated principal stress vectors can be determined, for example, using the techniques disclosed in U.S. Pat. No. 10,800,115 (the '115 patent) and U.S. Pat Pub. 2021/0279384, both of which are incorporated by reference herein.

Briefly, the '115 patent discloses: (a) developing a description of the part's geometry, (b) developing a description of the part's anticipated loading conditions, and (c) performing a finite element analysis (FEA) on the part geometry to calculate the stress under load. This results in a three-dimensional principal stress contour map for the interior of the component. Additionally, the '115 patent discloses that by considering the orthotropic material properties at hand, a preform "map" (i.e., a preform layout) can be developed from the principal stress contour map, such as by using a technique that determines "low-cost" routing.

In view of any number of physical constraints, it is unlikely that an "optimal" fiber alignment determined via FEA, as discussed above, can be realized. The method disclosed in the '115 patent acknowledges and compensates for such physical limitations by modifying the idealized output from FEA analysis to provide a "process-compensated" preform map, via an iterative approach.

Regarding step (c) above, for every point in a part with a given load case, there exists a stress state with six stresses aligned with the x, y, z axes and the shear stresses between them. If one rotates that stress state such that the shear stresses go to zero, the result is three, mutually orthogonal principal stresses. Each principal stress has a magnitude (which can be zero) and a direction; hence "stress vector." The directions are orthogonal to one another. This stress tensor can rotate and change in magnitude from one element (in the finite element analysis) to the next.

Thus, in addition to the process improvements resulting from the present teachings, using FB preforms in a compression molding process enhances the mechanical properties of fiber-composite parts formed therefrom. And the presence of VSF constituents, in conjunction with the FB preforms, provides an ability to impart/enhance non-mechanical properties of the part, with little compromise to its mechanical properties.

Optimization of Part performance. Another ancillary benefit of the improved compression molding process described herein is an enhanced ability to optimize part performance. This accrues from the ability to freely select, within a region of a part formed from VSF constituents 300, (i) fiber length, (ii) fiber type, and (iii) relative distributions of (i) and/or (ii), among other parameters.

For example, consider a part in which the region of interest includes fibers having the following three lengths: A=50 μm (0.05 mm), B=250 μm (0.25 mm), and C=600 μm (0.6 mm), wherein 50% of the fibers have length A, and 25% of the fibers have length B, and 25% of the fibers have length C. One or more VSF constituents 300 having the appropriate distribution of such fibers is provided. Or three types of VSF constituents, one for each fiber length, may suitably be used.

Alternatively, or additionally, a region of a part may vary in fiber type. For example, the region of interest might include 50% carbon fiber and 50% glass fiber. It is to be understood that regions created from VSF constituents 300 can suitably include any number of different types of fibers, and in any length up to about 1 mm, and in any distribution therebetween. The ability to create a desired fiber distribution (type, length, relative amount) in such a region enables a manufacturer to achieve desired characteristics for a fiber-composite part.

The combination of different types of fibers also enables the creation of "multi-scale" fiber reinforcement. In such an embodiment, for a region of interest, the reinforcing fibers are of different lengths and diameters, but selected such that the fibers are "scaled" versions of each other. Consider, as a non-limiting example, carbon fiber with a diameter of 12 μm (0.012 mm) and a length of 200 μm (0.2 mm), combined with glass fiber having a diameter of 6 μm (0.006 mm) and a length of 100 μm (0.1 mm).

Facilitate Fabrication of Parts having a Complex Geometry. A further benefit of VSF constituents 300 is their ability to facilitate a desired alignment of the relatively long fibers from FB preforms 200, particularly for parts having a complex geometry. Specifically, very-short fibers 330 from VSF constituents 300 readily flow along with liquefied resin. And as they do, they can "drag" the ends of relatively long fibers 230 from FB preforms 200, assisting in the positioning of these long fibers in the mold cavity. An example of this capability is illustrated in FIGS. 6A-6D.

FIG. 6A depicts compression mold 650 having male mold portion 652 and female mold portion 654, wherein mold cavity 656 is defined in the female mold portion. Mold cavity 656 includes pin 658 for creating a hole in a molded part. Assemblage 660 of feed constituents is disposed in mold cavity 656 above pin 658. In this embodiment, assemblage 660 is a preform charge, arranged as depicted in FIG. 6B.

Assemblage 660 includes VSF constituents 300 positioned at the bottom thereof, at the left and right edges. These VSF constituents 300 are positioned to be proximal to parting lines 632. The long axis of these VSF constituents 300 are substantially parallel to the (future) parting lines. These VSF constituents 300 will thus ensure that the flash that forms consist primary of very short fibers. For clarity of illustration, very-short fiber constituents 300 are shown as "dotted lines."

Assemblage 660 also includes, in the two uppermost layers, VSF constituents 300. As depicted, VSF constituents 300 represent about one third of the feed constituents of assemblage 660. In actual practice however, the percentage of VSF constituents 300 is typically far less, since mechanical properties, as provided by FB preforms 200, is virtually always of paramount concern. And while post-processing can improve the aesthetic characteristics of a part at a sacrifice in efficiency and cost, nothing can be done to remediate a part that falls short of a mechanical specification.

As shown, VSF constituents 300 will typically have the same overall form factor ((i.e., length, cross-sectional shape, and diameter) as FB preforms 200. As previously noted, having an identical or nearly identical form factor to the FB preforms simplifies registering VSF constituents 300 within a mold cavity, and facilitates their incorporation along with FB preforms into a preform charge. It is to be understood, however, the fibers associated VSF constituent 300 are nevertheless very short, per the definition thereof, irrespective of the potentially greater length of VSF constituent 300.

During the compression-molding process, mold 650 is heated so that the (typically) thermoplastic resin in FB preforms 200 and VSF constituents 300 attains the melt-flow state. Once the resin is flowable, advancing male mold 652 forces relatively long fibers from FB preforms 200 past pin 658, such that long fibers 201 adopt a "u-shape," per FIG. 6C. The very-small fibers from VSF constituents 300 readily flow downward due to the pressure differential resulting from compression-molding operations, pushing/dragging the distal ends of long fibers 201 from FB preforms 200 towards the bottom of mold cavity 656. In the absence of the very short fibers, the distal ends of the longer fibers from FB preforms 200 would not uniformly and reliably travel to the bottom of the mold cavity. This would compromise the mechanical properties of the finished part. Finished part 662 is depicted in FIG. 6D. Using the present method, a fiber-composite part having a u-shaped fiber alignment is created from linear FB preforms. The time (and hence cost) that would otherwise be required to bend the preforms into a u-shape in advance is thus avoided.

It is to be understood that the disclosure describes a few embodiments and that many variations of the invention can easily be devised by those skilled in the art after reading this disclosure and that the scope of the present invention is to be determined by the following claims.

What is claimed:

1. An assemblage of feed constituents for use in conjunction with a compression mold for compression-molding a fiber-composite part, the assemblage comprising:

a plurality of fiber bundle (FB) preforms, each FB preform consisting essentially of a plurality of co-aligned, resin-infused fibers, each FB preform having a filamentous form with a substantially circular or oval cross section, wherein a length of the fibers in each FB preform is at least 5 millimeters; and a plurality of very-short-fiber (VSF) constituents having a filamentous form, each VSF constituent consisting essentially of a plurality of resin-infused fibers, in the form of one or both of milled fibers and chopped fibers less than about 1 millimeter in length and having a random orientation in the VSF constituent, wherein:

(a) a length of at least some of the VSF constituents is substantially the same as a length of at least some of the FB preforms, (b) the plurality of FB preforms and the plurality of VSF constituents are organized into an assemblage, and (c) respective FB preforms of the plurality thereof are individually positioned with a predetermined location and orientation in the assemblage, wherein the predetermined position and orientation in the assemblage results, within the fiber-composite part, in alignment of the fibers from the respective FB preforms with stress vectors determined to arise at those positions when the fiber-composite part is in use.

2. The assemblage of claim 1 wherein a diameter of at least some of the VSF constituents is about the same as a diameter of at least some of the FB preforms.

3. The assemblage of claim 1 wherein the assemblage comprises a preform charge consisting essentially of the plurality of FB preforms.

4. The assemblage of claim 1 wherein the assemblage consists essentially of a preform charge, the preform charge consisting essentially of the plurality of FB preforms and the plurality of very-short fiber constituents.

5. The assemblage of claim 1 wherein a first VSF constituent of the plurality thereof is positioned in the assemblage so that after compression molding of the assemblage, the fibers from the first VSF constituent, as integrated into the fiber-composite part, are proximal to a parting line on the fiber-composite part.

6. The assemblage of claim 5 wherein, when the assemblage is placed in a mold cavity of the compression mold, a long axis of the first VSF constituent is substantially parallel to edges of the compression mold that form, after compression molding, a parting line of the fiber-composite part, such that an orientation of the long axis of the first VSF constituent when in the mold cavity corresponds to an orientation of the parting line appearing on the fiber-composite part.

7. The assemblage of claim 5 wherein a second VSF constituent of the plurality thereof is positioned in the assemblage so that, when placed in a mold cavity of the compression mold, the second VSF constituent is proximal to an ejector pin.

8. The assemblage of claim 5 wherein a second VSF constituent of the plurality thereof is proximal to a minor feature in a mold cavity of the compression mold, so that fibers and resin from the VSF constituent flow into the minor feature during compression molding.

9. The assemblage of claim 5 wherein some of the VSF constituents of the plurality thereof are disposed on a surface of the assemblage.

10. The assemblage of claim 1 wherein at least one VSF constituent is positioned in the assemblage in a location such that when the assemblage is disposed in a compression mold, the at least one VSF constituent is proximal to a minor feature in a mold cavity of the compression mold, so that fibers and resin from the VSF constituent flow into the minor feature during compression molding.

11. The assemblage of claim 10 wherein the fibers in the at least one VSF constituent are glass fibers, the minor feature serving as an RF window in the fiber-composite part.

12. The assemblage of claim 1 wherein at least some of the VSF constituents impart, to a portion of the fiber-composite part, attributes selected from the group consisting of electromagnetic shielding, electromagnetic transparency, and color.

13. The assemblage of claim 1 wherein resin infusing the fibers in the VSF constituents is a treated with a color dye, the dye providing a desired color for the fiber-composite part, and wherein the fibers of the VSF constituents are substantially optically transparent.

14. An assemblage of feed constituents for use in conjunction with a compression mold for compression-molding a fiber-composite part, the assemblage comprising:

a plurality of fiber bundle (FB) preforms, each consisting essentially of a plurality of co-aligned, resin-infused fibers, and having a filamentous form with a substantially circular or oval cross section, and wherein a length of the fibers in each FB preform is at least 5 millimeters; and a plurality of very-short-fiber (VSF) constituents having a filamentous form, each consisting essentially of a plurality of resin-infused milled and/or chopped fibers, both less than about 1 millimeter in length, a length and a diameter of at least some of the VSF constituents is substantially the same as a length and a diameter of at least some of the FB preforms;

wherein the plurality of FB preforms and the plurality of VSF constituents are organized into an assemblage, wherein some of the VSF constituents are positioned in the assemblage so that:

(a) when the assemblage is placed in a mold cavity of the compression mold, a long axis of each of said some VSF constituents is substantially parallel to respective edges of the compression mold that form, after compression molding, parting lines of the fiber-composite part, such that an orientation of the long axis of said some VSF constituents when in the mold cavity corresponds to an orientation of the parting lines appearing on the fiber-composite part; and (b) after compression molding of the assemblage, the fibers from said some VSF constituents, as integrated into the fiber-composite part, are proximal to the parting lines.

15. The assemblage of claim 14 wherein some other of the VSF constituents are positioned at a surface of the assemblage.

* * * * *